US007486747B1

(12) United States Patent
Bagley et al.

(10) Patent No.: US 7,486,747 B1
(45) Date of Patent: Feb. 3, 2009

(54) DIGITAL TIMING RECOVERY OPERABLE AT VERY LOW OR LESS THAN ZERO DB $E_B/N_O$

(75) Inventors: Zachary C. Bagley, Salt Lake City, UT (US); Christian Schlegel, Park City, UT (US)

(73) Assignee: L-3 Communications Corporation, New York, NY (US)

( * ) Notice: Subject to any disclaimer, the term of this patent is extended or adjusted under 35 U.S.C. 154(b) by 599 days.

(21) Appl. No.: 10/888,280

(22) Filed: Jul. 9, 2004

(51) Int. Cl.
 *H04L 27/00* (2006.01)
(52) U.S. Cl. ...................................... 375/324; 375/355
(58) Field of Classification Search ......... 375/324–327, 375/346, 349, 350, 355, 285, 362, 373
 See application file for complete search history.

(56) References Cited

U.S. PATENT DOCUMENTS

| 5,369,668 | A | * | 11/1994 | Yamamoto | 375/233 |
| 5,400,368 | A | * | 3/1995 | Cheng et al. | 375/354 |
| 5,493,307 | A | * | 2/1996 | Tsujimoto | 342/380 |
| 5,504,785 | A | * | 4/1996 | Becker et al. | 375/344 |
| 5,724,396 | A | * | 3/1998 | Claydon et al. | 375/355 |
| 6,055,284 | A | | 4/2000 | Kweon | 375/355 |
| 6,560,299 | B1 | * | 5/2003 | Strolle et al. | 375/347 |
| 7,180,963 | B2 | * | 2/2007 | Wang et al. | 375/324 |
| 2003/0179838 | A1 | * | 9/2003 | Hamon | 375/326 |
| 2005/0069025 | A1 | * | 3/2005 | Kimura | 375/152 |
| 2005/0238124 | A1 | * | 10/2005 | Becker et al. | 375/350 |
| 2006/0002689 | A1 | * | 1/2006 | Yang et al. | 386/124 |

* cited by examiner

*Primary Examiner*—Khanh C Tran
(74) *Attorney, Agent, or Firm*—Harrington & Smith, PC

(57) ABSTRACT

A receiver (20) for performing timing recovery over at least one complex channel at low or less than zero SNR (signal power to noise power, in dB) has at least one receive element such as an antenna, an analog-to-digital converter 21 (ADC), a fractional interpolation filter 23, a matched filter 24, and a timing correction loop 26. The timing correction loop 26 selects a minimum mean square error from the output of the matched filter 24 to determine a timing signal output to the interpolation filter 23, and provides one-bit weights to the matched filter 24. Preferably, the timing correction loop 26 includes a magnitude detector 26c, a moving average filter 26b, and a timing error detector 26a that outputs an integer m and fractional µ timing factor to the interpolation filter 23. Within a phase correction loop 27 is a maximum likelihood channel estimator 27b and a phase error detector 27a that controls a phase rotator 22 disposed between the ADC 21 and the interpolation filter 23.

11 Claims, 7 Drawing Sheets

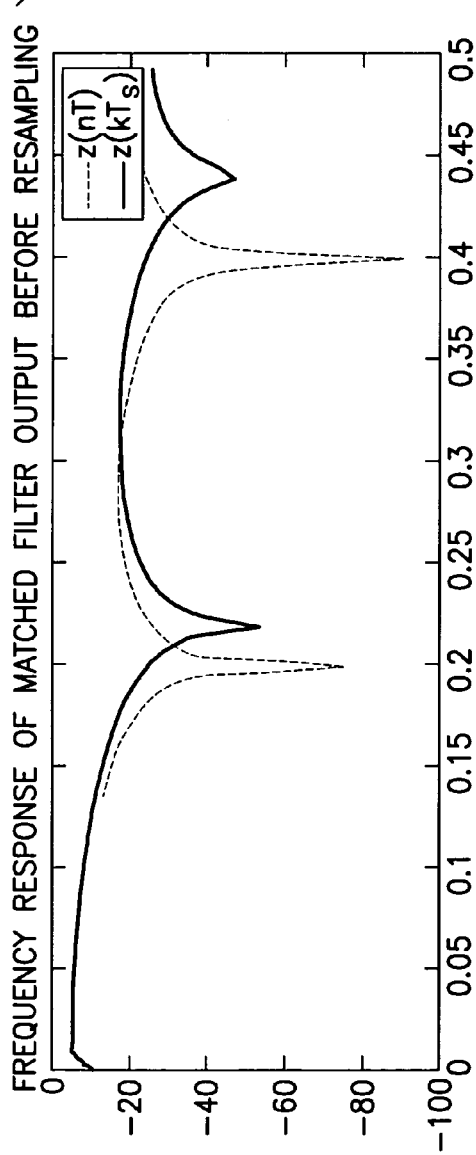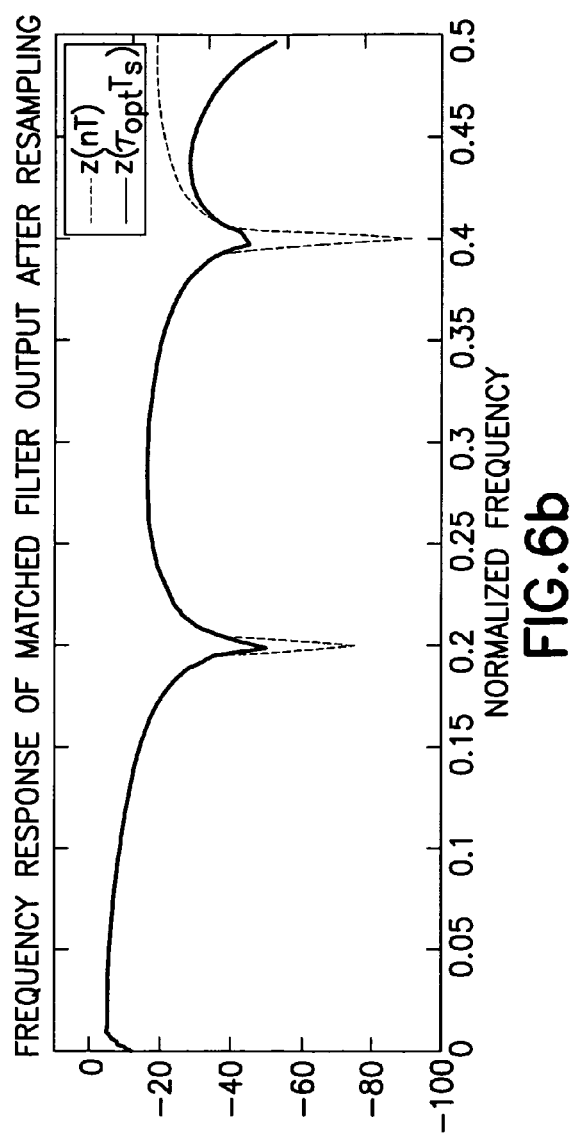
FIG.6a
FIG.6b
FIG.6

US 7,486,747 B1

DIGITAL TIMING RECOVERY OPERABLE AT VERY LOW OR LESS THAN ZERO DB $E_B/N_O$

TECHNICAL FIELD

These teachings relate generally to timing and phase recovery for a multiple-input multiple-output (MlIMO) communication system such as a wired or wireless system using complex baseband signals having at least two orthogonal (e.g., in-phase and quadrature) channels. It is particularly directed to timing recovery at very low signal to noise ratios, such as may be encountered with iterative coding and decoding (Turbo coding) schemes.

BACKGROUND

In a typical digital communication system, a receiver samples a transmitted analog signal using a predetermined sampling clock to convert the sampled analog signal to a digital signal. Some systems synchronize the received signal to the transmitted signal by including timing and phase information within the data stream, which the receiver uses directly. More sophisticated digital processing enables the receiver to determine phase and timing from characteristics of the received data stream itself, when the transmitter does not explicitly include separate time and phase information in a transmission. This technique is referred to as timing and phase recovery, which saves bandwidth by eliminating the recurring need to transmit timing and phase data.

FIG. 1 is a block diagram showing a prior art digital timing recovery circuit, wherein timing recovery is realized through a feedback loop. The digital timing recovery circuit comprises a sampling clock generator 11, a first sampler 12, an interpolator 13, a data filter 14, a timing error detector 15, a loop filter 16, and a controller 17. The sampling clock generator 11 controls the time period $T_s$ at which discrete samples are taken, in which aliasing does not occur. The first sampler 12 generates and outputs a signal $X(mT_s)$, which samples a band limited input signal $X(t)$ according to the sampling clock 11. The interpolator 13 generates and outputs an interpolant $y(kT_i)$ at a time $T_i$ between samples taken by the first sampler 12 at times $T_s$. The data filter 14 filters the interpolant $y(kT_i)$ to output the final data strobe. The timing error detector 15 detects a timing error from the data strobe. The loop filter 16 removes a noise component of the detected timing error. The controller 17 controls operation of the interpolator 13 by using the filtered timing error to perform the exact timing recovery.

However, the circuit shown in FIG. 1 is limited to a scalar (single channel) input and is not appropriate for a vector (multi-channel) input. Multi-channel applications are becoming increasingly important as researchers refine techniques for multiple-input, multiple-output (MIMO) systems wherein a transmitter and/or receiver employ multiple antennas. MIMO systems are of increasing interest, especially for wireless applications, for their potential to provide greatly increased data rates over a set bandwidth as compared to single channel systems.

Another disadvantage of the circuit of FIG. 1 is that the interpolator 13 interpolates or resamples once rather than resampling and reinterpolating the data multiple times within each period $T_s$. As such, the prior art circuit of FIG. 1 is limited to operation with a baseband signal input $X(t)$ and cannot process a passband signal input.

SUMMARY OF THE PREFERRED EMBODIMENTS

The foregoing and other problems are overcome, and other advantages are realized, in accordance with the presently preferred embodiments of these teachings. In accordance with one aspect of the present invention is a receiver for performing timing recovery at low signal to noise ratio SNR (signal power to noise power, in dB). The term SNR is used in general to indicate any measure of signal power to noise power, and specifically includes the ratio of symbol or bit energy to noise power spectral density $E_b/N_0$. The receiver includes at least one antenna for receiving a signal vector over at least one complex communication channel. In a wireless system, each complex communication channel is preferably defined by one in-phase signal and one quadrature offset signal. Most preferably, the channels are sub-channels of a digital communication system using code division multiple access (CDMA). The antenna receives the signal and outputs it to an analog-to-digital converter (ADC) for sampling the received signal vector at a fixed rate. A fixed rate indicates that the local clock of the receiver 20 is not adjusted. The receiver also includes an interpolation filter having an input coupled to an output of the ADC. Preferably, the interpolation filter is a fractional interpolation filter for precise timing control that adjusts the pulse shape and not the receiver local clock. The receiver further includes a matched filter and a timing correction loop. The matched filter has an input coupled to an output of the interpolation filter, and provides a sample with a maximized SNR ratio. The timing correction loop providing feedback from the matched filter to the interpolation filter, and operates to determine a minimum mean square error from the output of the matched filter and comprising a filter weight block having an output of one-bit filter weights coupled to an input of the matched filter.

Preferably, the timing correction loop includes a magnitude detector coupled to the output of the matched filter, a moving average (MA) filter coupled to the output of the magnitude detector, and a timing error detector coupled to the output of the MA filter. The timing error detector provides a timing signal to the interpolation filter so that re-sampling may be taken at, preferably, the instant of maximum SNR.

Preferably, the receiver also includes a phase correction loop that provides feedback from the matched filter to a phase rotator. The phase rotator is disposed between the ADC and the interpolation filter, so that timing corrections are applied to a signal adjusted for any phase correction factor. Preferably, the phase correction loop includes a channel estimator that uses a maximum likelihood estimator to determine each channel from the output of the matched filter, and further includes a phase error detector that computes an arctangent of a phase angle output from the channel estimator to provide a phase correction factor to the phase rotator.

The present invention also includes a method of providing timing recovery in a receiver. The method includes receiving a vector of signals over at least one complex channel, sampling the vector of signals at a sampling time $T_s$, re-sampling the vector of signals at a time that optimizes SNR without adjusting a local clock of the receiver, and filtering the re-sampled vector of signals with a matched filter controlled by one-bit filter weights. Preferably, timing and phase correction feedback loops each receive an identical input coupled to an output of the matched filter.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 6a-6b are graphs of matched filter frequency response before re-sampling (6a) and after re-sampling (6b).

DETAILED DESCRIPTION OF THE PREFERRED EMBODIMENTS

Figure 1:
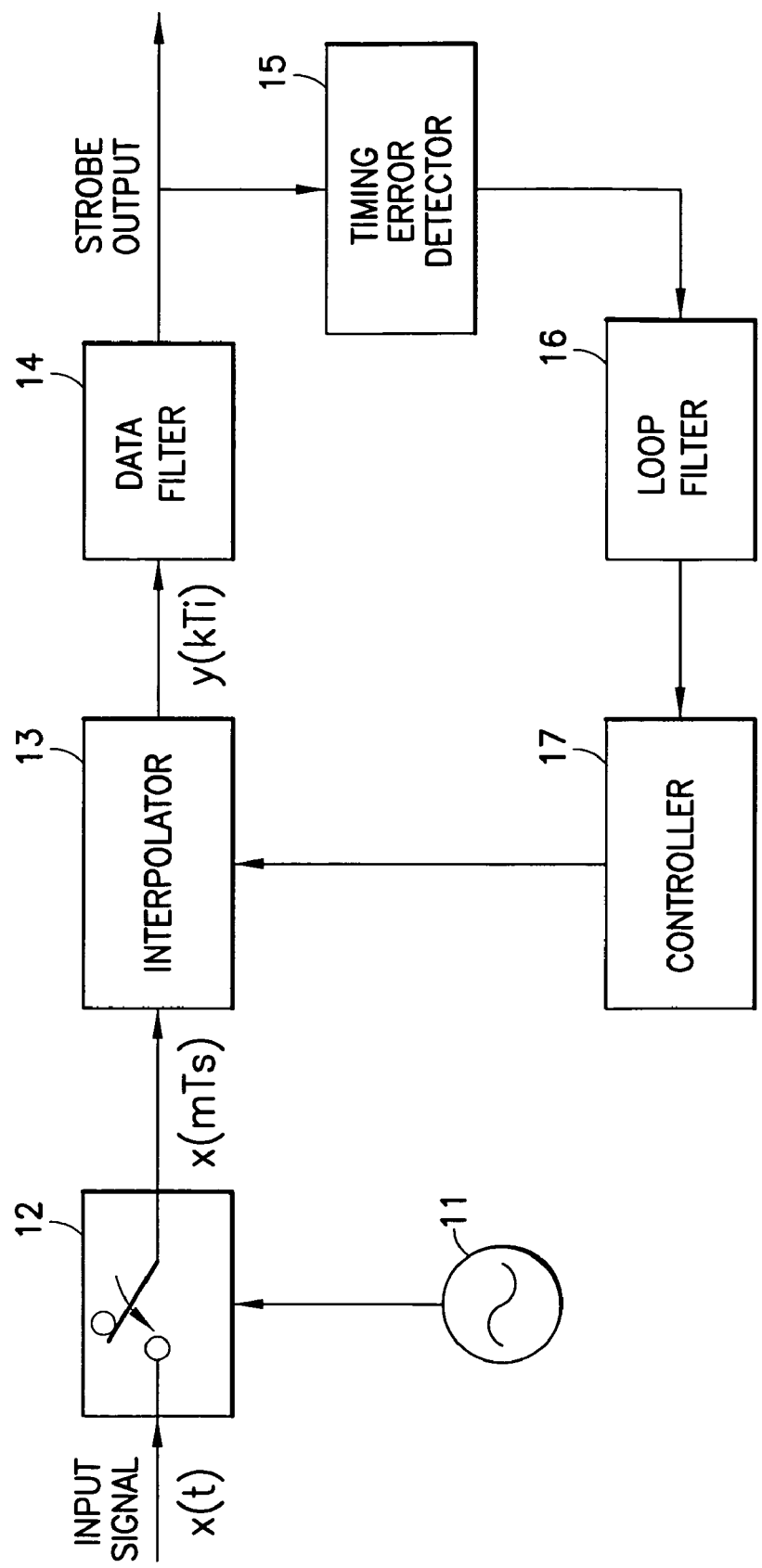
FIG. 1 is a block diagram showing a prior art digital timing recovery circuit.
Figure 2:
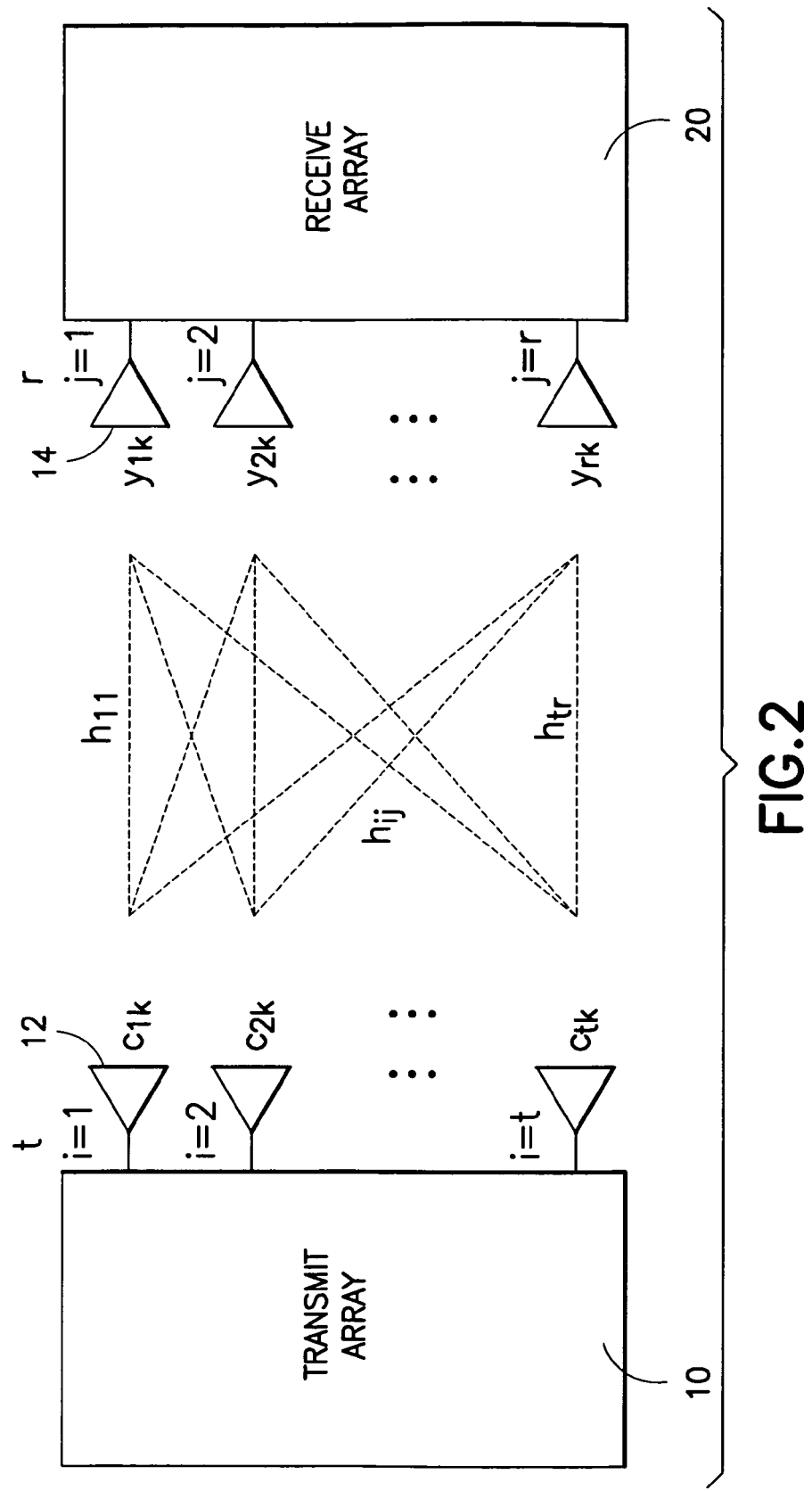
FIG. 2 is a block diagram showing a MIMO system in which the present invention may be employed.

FIG. 2 depicts in block diagram a MIMO communication system in which the present invention may operate. A transmitter 10 includes one or a plurality of transmit elements 12, depicted as antennas of a wireless system and indexed i, wherein i=1, 2, ... t. Similarly, a receiver 20 includes one or a plurality of receiver elements 14 that are indexed as j, wherein j=1, 2, ... r. Communications between an $i^{th}$ transmit antenna 12 and a $j^{th}$ receive antenna 14 occurs over a unique sub-channel with channel response $h_{ij}$ and some noise that may be introduced over the channel or by electronics in the transmitter 10 and/or the receiver 20. In vector notation, the channel response representing all sub-channels for a $k^{th}$ time instant is $\bar{H}_k$, the transmitted signal is $\bar{x}_k$, the received signal is $\bar{y}_k$, and noise is represented by $\bar{n}_k$. Preferably, each transmitted signal $x_k$ includes an in-phase I and a quadrature Q component.

An oscillator at the transmitter 10 generates a sinusoidal carrier signal at carrier frequency. Due to oscillator drift, the actual frequency of the carrier will deviate slightly from an ideal value. This carrier is multiplied by the data to modulate the signal up to a passband center frequency. At the receiver, the passband signal is multiplied by a sinusoid generated by the local oscillator. Ideally, the frequency of the local oscillator exactly matches the frequency of the oscillator used at the transmitter 10. In practice, the oscillator frequencies differ, so instead of demodulation bringing the signal to baseband, the demodulated signal exhibits some frequency offset from baseband. The presence of this frequency offset generally causes the received signal constellation to rotate. This rotation effect must be removed before accurate symbol decisions can be made.

Two quantities should be determined by the receiver 20 to achieve symbol synchronization: sampling frequency and sampling phase. Locking the sampling frequency entails estimating the symbol period so that samples can be taken at the correct rate. Although this quantity should be known (e.g., the system's symbol rate is specified to be 20 MHz), oscillator drift will introduce deviations from the stated symbol rate. Locking the sampling phase involves determining the correct time within a symbol period to take a sample. Symbol pulse shapes define a peak in the center of the symbol period. Sampling the symbol precisely at this peak maximizes the symbol (or bit) energy to noise power spectral density (generally, signal to noise ratio or SNR). Maximizing SNR allows effects from other nearby signals, known as inter-symbol interference (ISI), to be minimized.

Figure 3:
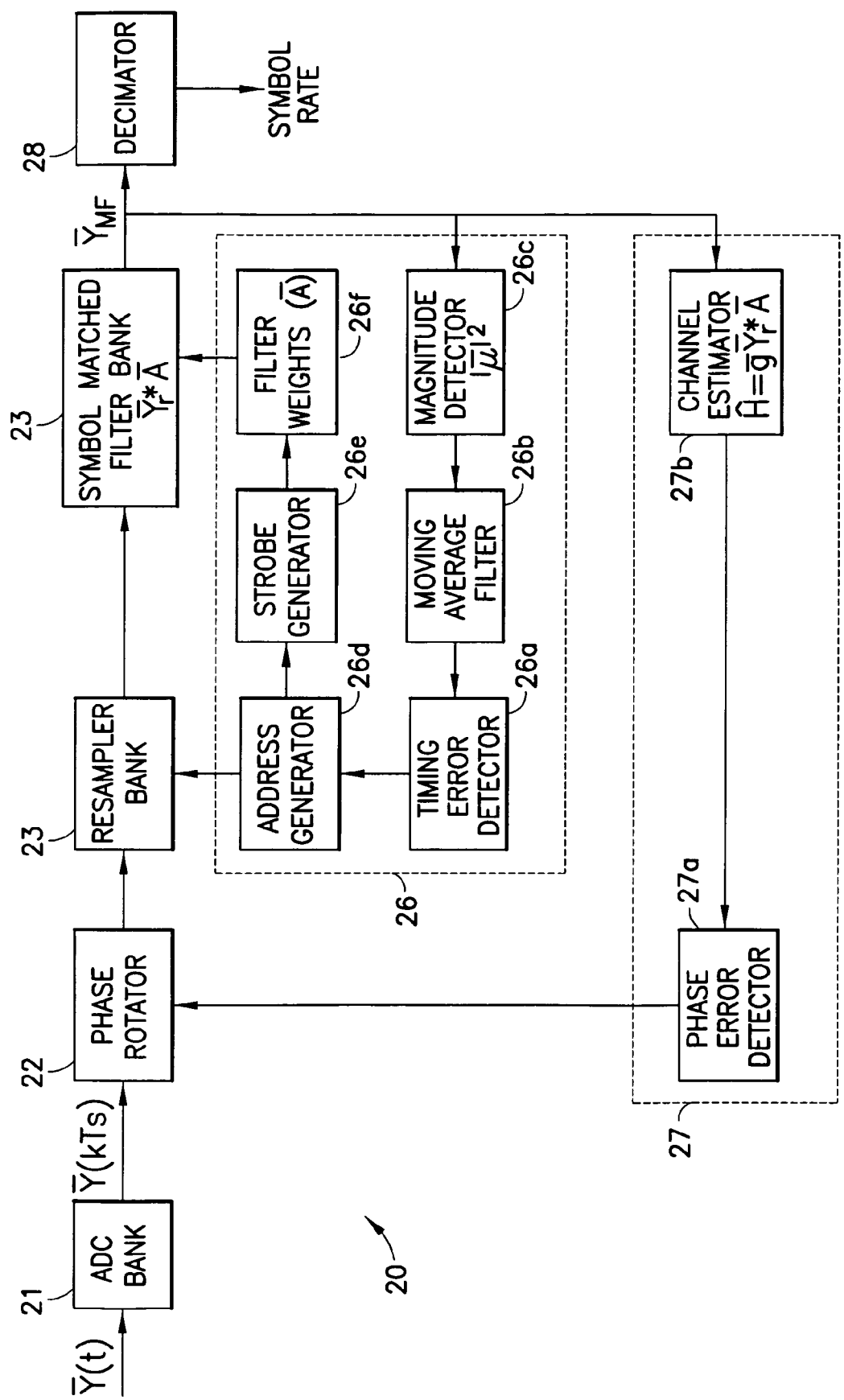
FIG. 3 is a block diagram of a digital acquisition and timing recovery system implementing features according to the present invention.

FIG. 3 is a block diagram of a digital acquisition and timing recovery system implementing features according to the present invention, detailed below. It will be appreciated that the sub-channel signals $\bar{y}_k$ are processed in parallel within FIG. 3.

ADC BANK (21). Analog to digital converters (ADC) are known in the art and need not be discussed in detail here other than to note that alternate embodiments of the present invention may use any suitable type of ADC. For example, the ADC Bank 21 may use ADC architectures such as successive approximation register (SAR), dual-slope, sigma-delta, flash, and/or semi-flash and pipeline ADCs. The ADC bank 21 receives an analog input signal y(t) and samples it at time intervals $T_s$. The output of the ADC 21 is then a series of discrete samples $y(kT_s)$ of the analog input waveform, wherein k is an index representing the $k^{th}$ sample. The ADC bank 21 is a plurality of ADCs, each converting the signal from one sub-channel (one element of the vector $\bar{y}_k$).

PHASE ROTATOR (22). The phase rotator 22 shifts the phase of the digital signals output from the ADC 21 in accordance with a correction factor input to the phase rotator from a phase loop 27. Conceptually, the phase rotator 22 rotates the symbol constellation to a precise orientation to remove a source of error that would otherwise accrue to symbol decisions made later within the receiver 20. Various phase rotators are known in the art. A simple embodiment that rotates a signal vector in increments of $\pi/2$ is a pair of four-to-one selectors in parallel with each other, wherein the four inputs to each selector are the inverted and non-inverted in-phase (I) and quadrature (Q) samples from an ADC. The phase rotator 22 serves to eliminate Doppler shifts in the sampled signal that may result from the I and Q components of the carrier wave or from multiple transmit and/or receive antennas. The output of the phase rotator 22 is the same as the input, $y(kT_s)$, but with a phase adjusted by a phase error value determined by the phase loop 27. To the extent that the phase error is accurate, the output of the phase rotator precisely matches that of the transmitted signal. The phase rotator 22 of the present invention multiplies each sample $y(kT_s)$ input from the ADC 21 by $e^{-j\theta(k)}$ to digitally shift the phase of the $k^{th}$ data sample. The phase $\theta(k)$ is corrected for phase error.

RESAMPLER BANK (23). The resampler 23 generates samples at times between those actually sampled by the A/D (i.e., it interpolates). By generating these intermediate samples as needed, the interpolator can provide a sample at any precise time, regardless of discrepancies between the transmit and receive clocks. Precise timing is important to minimize decision errors by maximizing the SNR ratio. The actual samples from the ADC 21 are spaced in time by the interval $T_s$. However, the exact instant of maximum difference between signal energy and noise may occur at $T_s+\tau$, wherein $0<\tau<T_s$. Interpolation provides the receiver 20 with an ideal sample exactly at $T_s+\tau$ without slowing the data rate through the ADC 21. Preferably, the resampler 23 moves the pulse shape of the signal to maximize SNR, rather than adjusting the local clock of the receiver 20 to strobe at the precise time. This is an important aspect of the invention as the local clock in the receiver (which is exhibited by the samples input to the interpolator 23) is asynchronous to the clock in the transmitter (which is exhibited by the point of maximum SNR in the received signal). The present invention interpolates to the point of maximum SNR without adjusting the local clock, despite the fact that the value for the timing error $\tau$ from the actual data sample $T_s$ may change from symbol to symbol.

Interpolation in the time domain can be accomplished by inserting zeros in the frequency domain between the actual data samples, mathematically calculating what the value of those added samples should be based on nearby actual samples, and filtering out aliased samples at either or both ends of the spectrum. Typically, a discrete Fourier transform is used to calculate the values of interpolated samples, and the resulting signal is a smoothed version of the original. The interpolated samples may be integer multiples of the sample interval $T_s$ as in the short explanation above, or may lie anywhere between the actual samples in the case of a fractional interpolator. The key to selecting precisely the best sample is the value of the timing error $\tau$. For that reason, the preferred embodiment of the present invention includes a fractional interpolator for resampling. The timing error is input into the resampler 23 from the timing loop 26, detailed below. To the extent that the determined or estimated timing error is accurate, the output of the interpolator 23 is a series of idealized samples that minimize decision errors due to noise. That is, the interpolated samples are at the point of maximum SNR.

SYMBOL MATCHED FILTER BANK (24). The receiver 20 estimates the transmitted signal by using a technique known as matched filtering. The output of a matched filter generally does not 'look' like the input (when plotted as a waveform). A matched filter output generally yields a larger gap between signal peak and noise than other linear filters. As is known in the art, a receiver 20 employing such a technique filters the signal samples $y(kT_s)$ with a filter whose shape is "matched" to the pulse shape of the transmitted signal. The output of the matched filter 24 is then sampled at time T. The pulse shape of the matched filter output is a time-reversed version of the transmitted pulse shape. Such processing has two advantages. First, typical pulse shapes have a low-pass response. By filtering the received signal that way, the frequencies containing the data signal are passed while the remaining frequencies are attenuated, limiting the amount of the noise spectrum that is passed on. Second, the matched filter correlates the received signal y(t) with the transmit pulse shape over the symbol period T. Matched filter processing results in a correlation gain by integrating the received signal energy while averaging out additive white Gaussian noise (AWGN).

The output $\overline{Y}_{MF}$ of the matched filter 24 is output to the timing loop 26, to the phase loop 27, and is also output as a soft decision output for further processing. Such further processing preferably includes a decimator 28 for reducing sample frequency to once per symbol period T. The timing loop 26 corrects for timing error, and includes a magnitude detector 26c, a moving average filter 26b, and a timing error detector 26a. The phase loop 27 corrects for phase error, and includes a channel estimator 27B and a phase error detector 27A.

MAGNITUDE DETECTOR (26c). The magnitude detector 26c takes the output $\overline{Y}_{MF}$ of the matched filter 24, removes the data modulation, and determines the fractional portion of the timing delay for feedback to the resampler 23. In polar notation, it is the amplitude of the vector output from the matched filter 24. Precise timing is broken into two components: an integer component m, which is accurate to within one sampling period $T_s$, and a fractional component $\mu$, which provides the remainder of the timing figure. The two components are added to yield a unique time at which the sample is to be taken. While the integer component is naturally a positive number, occasionally the fractional component would be negative absent controls. The magnitude detector 26c determines the fractional component $\mu$ and outputs only its absolute value to the moving average filter 26b. Specific calculations are detailed below in the section explaining timing loop operation.

MOVING AVERAGE FILTER (26b). The moving average filter 26b serves to smooth short-lived instantaneous changes in the fractional component $\mu$ by collecting several values and outputting their mean, median, mode, or other mathematical characteristic of the group. The moving average filter 26b operates by averaging a number of points input from the magnitude detector 26c to produce each output to the timing error detector 26a. In general, moving average filters are optimized for the time domain, where they reduce random noise, retain a sharp step response, and are faster than Gaussian or Blackman filters. They are therefore appropriate for the timing loop 26 of the present invention. The moving average filter 26b is preferably an infinite impulse response (IIR) filter having a single forward tap and a single backward tap. While moving average (MA) filters are known in the art in numerous embodiments, the specific operation, and tap responses, for the preferred moving average filter 26b are detailed below.

TIMING ERROR DETECTOR (26a). The timing error detector 26a receives the mean fractional delay from the MA filter 26b, which changes over time as the fractional delay $\mu$ output from the magnitude detector 26c changes. The timing error detector 26a calculates one of a maximum, a median, or a mode of several means from the MA filter 26b, depending upon the channel, and outputs a time to the re-sampler 23 that is a combination of the integer component m and the fractional component $\mu$ of the timing signal. The resampler 23 then interpolates a sample at the precise time determined by the timing error detector 26a, that ideally matches the time nT from the transmitter. Preferably, the timing error detector operates to move the pulse shape at the resampler bank 23 rather than adjusting the local clock in the receiver 20.

ADDRESS GENERATOR (26d). Preferably, the timing loop 26 includes an address generator 26d disposed between the timing error detector 26a and the interpolator 23. The address generator 26d takes an input from the timing error generator 26a to determine an address of a lookup table, and the timing offset associated with that particular address is output to the interpolator 23. The transfer function that the address generator 23d uses is loaded in RAM and may be determined either a priori or adaptively. This allows a very complex error detector and adaptive control scheme without the delays normally associated with such intense calculations.

STROBE GENERATOR (26e). The strobe generator 26e has an input coupled to the output of the timing error detector 26a and produces a data strobe at a time determined by the timing error detector 26a. Strobe generators are known in the art and are not further detailed.

FILTER WEIGHT BLOCK (26f). When the modulation of the received signal is spread spectrum, or when the waveform is using square pulse shaping, the coefficients for the symbol matched filter 24 are $$\overline{\alpha} = \begin{bmatrix} \alpha_0 \\ \alpha_1 \\ \vdots \\ \alpha_{N-1} \end{bmatrix},$$

where N is the number of samples per symbol. For the case of a direct spread-spectrum signal, the $\alpha_i$'s are pseudo-random ±1. For the case of a square/rectangular pulse shaping, the $\alpha_i$'s are all +1. When N is much greater than one, even a shaped pulse can be approximated by one-bit weights at a minimal cost of SNR. The implementation of the re-saplinhg filter compensates for the pulse-shaping such that the implementation loss due to the one-bit weights in minimized when the number of samples per symbol N is between two and ten.

CHANNEL ESTIMATOR (27b). The channel is the frequencyband through which data flow. For a communication system with more than one transmit and/or receive antenna, the data flows over numerous sub-channels defined by the pairing of each transmit to each receive antenna, wherein each sub-channel is a portion of the main channel. In a MIMO system, the channel estimator 27B determines the frequency band of each sub-channel. In a system with one transmitter and one receiver antenna, the channel estimator 27b determines the frequency band of the single channel. As noted in the background section above, information regarding frequency and timing are not explicitly transmitted. The channel estimator 27b cannot know for certain the true parameters of the channel or sub-channel, and as its name implies, it must estimate them. The channel estimator 27b does this through a mathematical algorithm, preferably a maximum likelihood algorithm as detailed below, though other algorithms may be suited to particular applications.

PHASE ERROR DETECTOR (27a). As is known in the art, the coherent reception of a quadrature-modulated signal requires the demodulation circuit 20 to unambiguously determine the transmitted signal phase. The phase as observed by the phase rotator 22 is determined from orthogonal components of the in-phase (I) signal and the quadrature-phase (Q) signal received from the ADC 21. The phase recovery is may be done in two steps: a sub-quadrature phase error resolution step and then a quadrature error phase resolution step. Sub-quadrature phase error may result from mismatches between the transmitter and the receiver components, e.g., clocks or oscillators, relative platform motion, and environmental conditions along the signal path. The sub-quadrature phase error is determined by phase loop 27 generating a phase error determined by an output of the matched filter 24. The phase rotator 22 uses the phase error to rotate the phase of the I-Q signals received from ADC 21. The phase loop 27 is iteratively repeated to minimize the phase error to provide sub-quadrature phase resolution. A preferred approach for generating a phase error is to perform, or approximate, an arctangent operation on the phase angle that is output from a maximum likelihood channel estimator (FIG. 3, item 27b), the algorithm of which is described below. The method of sub-quadrature phase resolution described above may lock on to the correct phase or one of the other three incorrect phases. In an alternate embodiment, a method for compensating digital data demodulation phase uncertainty is described in commonly owned patent application "Method and Device for Compensating for Digital Data Demodulation Phase Uncertainty", filed on Oct. 17, 2002 and bearing Ser. No. 10/273, 929, which is incorporated in its entirety by reference. The described method includes the steps of identifying a phase reference quadrant, the phase reference quadrant having a phase reference axis and four quadrants, I, II, III, and IV; receiving digital data; and forming a phase vector from the data, determining which quadrant the phase vector is located in and rotating the phase vector to the phase reference quadrant if it is determined that the phase vector is not located in the phase reference quadrant. The last step generates a phase error signal proportional to the resulting angle by rotating the phase vector −45° and measuring the resulting angle between the phase vector and the phase reference axis.

TIMING LOOP 26 OPERATION. The following discussion presumes a MIMO system for which the present invention is most useful, but is equally applicable to a system bearing one transmit and one receive antenna. The overall concept of the timing loop is to digitally resaample the output of the ADC 21 such that the ratio of average $E_b/N_0$ is maximized at the output of the matched filter 24, even when the SNR is very low. For the following equations, n and k are time indexes, T represents time from the transmit clock, $T_s$ represents sample time determined by the receiver clock, each of the t transmit antennas is identified by the index i=1, 2, . . . t, and each of the r receive antennas is identified by the index j=1, 2, . . . r. The received waveform vector after the ADC 21 samples the array of j receive antennas at time instants $kT_s$ is given by:

$$\overline{y}(kT_s) = \overline{H}_k \overline{x}_k + \overline{n}_k \quad (1)$$

wherein $\overline{H}_k$ is the channel response vector for the samples taken at time k and $\overline{x}_k$ is a vector of samples defined by the transmitted pulses of duration T and $\overline{n}_k$ is a noise vector. The components of the vector $\overline{y}(kT_s)$ are the responses $r(kT_s)$ by each $j^{th}$ receive antenna:

$$r(kT_s) = y_j(kT_s) = \sum_{i=1}^{N_1} h_{j,i} x_{i,j} + n_{k,j} \quad (2)$$

In general, the ideal SNR is maximized when the output z(t) of a linear filter matched to the overall channel response H is sampled at time instants nT:

$$z(nT) = \int_{-\infty}^{+\infty} r(t) g_{MF}(nT - t) dt \quad (3)$$

The value nT is not known at the receiver and typically $T/T_s$ is a rational number due to oscillator uncertainty and drift. The function of timing recovery in the timing loop 26 is to provide samples synchronous to nT using samples defined by $kT_s$:

$$z(nT) = T_s \sum_{-\infty}^{+\infty} r(kT_s) g_{MF}(nT - kT_s) = T_s \sum_{k=-\infty}^{+\infty} r(kT_s) g_{MF}(\tau_{opt} T_s - kT_s). \quad (4)$$

Figure 4:
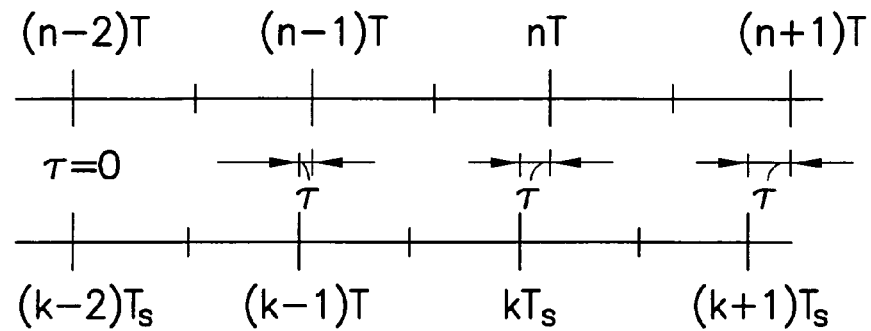
FIG. 4 is a pair of timelines, wherein the top timeline depict idealized sampling according to the transmitter clock and the bottom timeline depicts sampling according to the receiver clock, the difference computed by the timing correction loop.
Figure 5:
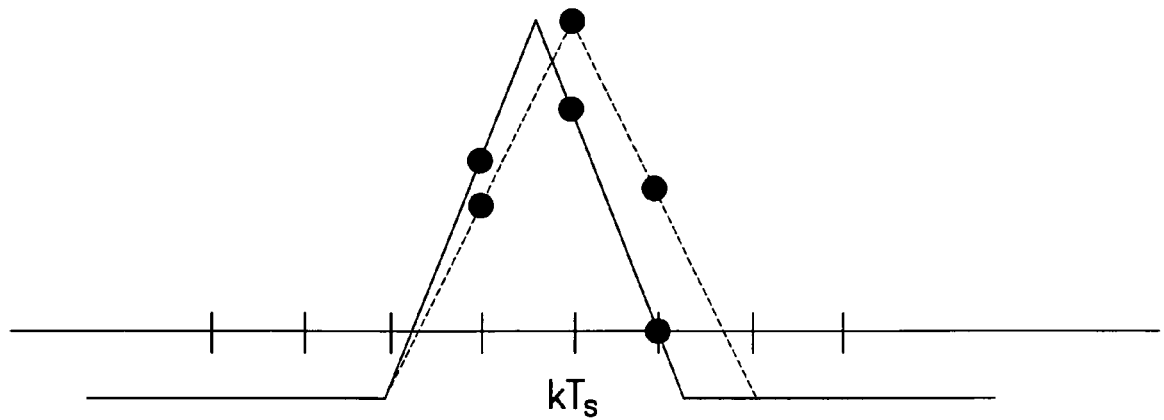
FIG. 5 is a pulse diagram depicting an idealized pulse in dashed line when timing is corrected versus a pulse taken from non-optimized re-sampling at the receiver (solid line).

This is shown graphically at FIG. 4, wherein the top timeline represents the ideal sample points and the lower timeline represents samples taken according to the receiver clock at times $kT_s$. The samples are asynchronous because $\tau$ is not constant. Similarly, FIG. 5 depicts a pulse output based on sampling (darkened circles) at different times from a linear matched filter 24. The solid line represents a pulse based on samples taken at non-optimized times $kT_s$. The dashed line represents a pulse based on samples taken at optimized times, wherein the correction T corresponds each time $kT_s$ with the idealized time nT such that SNR is maximized. Samples synchronous to nT can be generated by digitally resampling at the interpolator 23 based on the timing error that occurs when m is a positive integer, $m \leq [n(T/T_s)-K] < m+1$. The parameter $\tau_{opt}$ is required for the interpolator 23 to produce inputs to the matched filter 24 so that the idealized sample points represented by the dashed line of FIG. 5 are generated. This is best done by decomposing the timing error into fractional and integer parts. As stated previously, $\tau_{opt}$ maximizes $E_b/N_0$ at the matched filter output with sample times $kT_s$, so:

$$\tau_{opt} = \underset{\tau}{\arg\max} \, E\{|z(n+\tau)T_s - kT_s)|^2\} = (n-k)_{modM} + \frac{T}{T_s} \quad (5)$$

However, the receiver does not know the value T from the transmitter. Defining the fractional part of the timing error as $\mu(x) = x - \lfloor x \rfloor$, and decomposing the ideal sampling times into an integer and a fractional part yields:

$$\tau_{opt} T_s - kT_s \cong \left[(n-k)_{modM} + \frac{T}{T_s}\right] = (m_n + \mu_n)T_s \quad (6)$$

The resampling parameter can then be computed from $\tau_{opt}$ as:

$$m_n = \lfloor \tau_{opt} \rfloor, \mu_n = m_n - \tau_{opt} \quad (7)$$

wherein $m_n$ is the integer delay that identifies the correct sampling point to within $\pm \frac{1}{2}T_s$, and $\mu_n$ resolves the remaining timing error.

The required response from the matched filter 24 can be factored into two filters according to the Nyquist sampling theorem, one for pulse shaping and one for interpolating. Mathematical manipulation yields:

$$z(nT) = T_s \sum_{k=-\infty}^{+\infty} \sum_{i=-\infty}^{+\infty} r(kT_s)p(m_nT_s)h_1[(m_n - i - k)T_s + \mu_nT_s] \quad (8)$$

which is $r(kT_s)$ filtered by $h_I(n)$ and then again filtered by $p(n)$. The term $h_I(n)$ represents the transfer function from the interpolation filter. Rewriting as $z_n = p[h_I(r_k, m_n, \mu_n)]$ wherein $h_I(r_k, m_n, \mu_n)$ is a time-varying filter operating on the samples $r(kT_s)$ shows that:

$$m_n = (k-n)_{mod\,samplespersymbol} + \left\lfloor \frac{T}{T_s} \right\rfloor \quad (9a)$$

$$\mu_n = \frac{T}{T_s} - m_n - (k-n)_{mod\,samplespersymbol} \quad (9b)$$

are the necessary parameters to produce samples synchronous to time instants nT using data sampled at time instants $\tau_{opt} T_s$, where $$\tau_{opt} = m_n + \mu_n = \left\lfloor \frac{T}{T_s} \right\rfloor - \frac{T}{T_s} \quad (10)$$

The maximum-likelihood estimation of sample times is derived by noting that the signal power out of the matched filter 24 is maximized when the following relation is true:

$$\tau_{opt} T = (n-k)T_s + \mu_n T_s = (n-k)T \quad (11)$$

Since the operation of the matched filter 24 maximizes $E_b/N_0$ over the interval $[-T/2, +T/2]$, then:

$$\underset{\mu}{\arg\min} \, E\{\|nT - kT_s + \mu T_s\|\} = \underset{\mu}{\arg\max} \, E\{\|z(nT - kT_s + \mu T_s)\|\} \quad (12)$$

The "arg max" function represents detecting the sampling point where the matched filter 24 output is maximized, so the error function can be quantified:

$$\tau_{err} T_s = \mu_{ref} - (\mu T_s - kT_s) = kT_s + \mu_{ref} - \mu T_s = kT_s + \hat{\tau} T_s \quad (13)$$

where $\mu_{ref}$ is usually defined so that the maximum amount of energy is centered in the digital matched filter 24. Since the matched filter 24 operation maximizes $E_b/N_0$ at the desired sampling points, the maximum-likelihood estimate of the timing error is the minimum mean square error (MMSE) estimator based on maximizing the $E_b/N_0$ at the matched filter 24 output:

$$\tau_{opt} = \underset{\tau}{\arg\max} \, E\{|z(\tau_{err} T_s)|^2\} = \underset{\tau}{\arg\max} \, E\{|z(kT_s + \tau T_s)^2\} \quad (14)$$

The "arg max" function is determined by performing the maximum, median or mode (depending upon the type of channel) in the timing error detector 26a of the moving average filter 24b output, and driving the error function based upon centering the energy in the filter 24b. As the estimate $\hat{\tau}$ converges, the re-sampled data has a spectral bandwidth that satisfies:

$$\frac{1}{\hat{\tau} T_s} \cong \frac{1}{(m_n + \mu_n)T_s} = \frac{1}{\tau_{opt} T_s} = \frac{1}{T} \text{Hz} \quad (15)$$

Results of frequency response of the matched filter 24 output are depicted graphically at FIG. 6a (before re-sampling) and FIG. 6b (after re-sampling).

The expected value operation is estimated using a moving average filter 26b with response for each FIR tap:

$$h_{MA}(z) = \frac{(1-\alpha)}{(1-\alpha z^{-1})} \quad (16)$$

which computes for tap index p:

$$\omega_p = \sum_{i=0}^{\infty} \alpha^i |z[(k-i)T_s + \hat{\tau} T_s]|^2 \quad (17)$$

Figure 7:
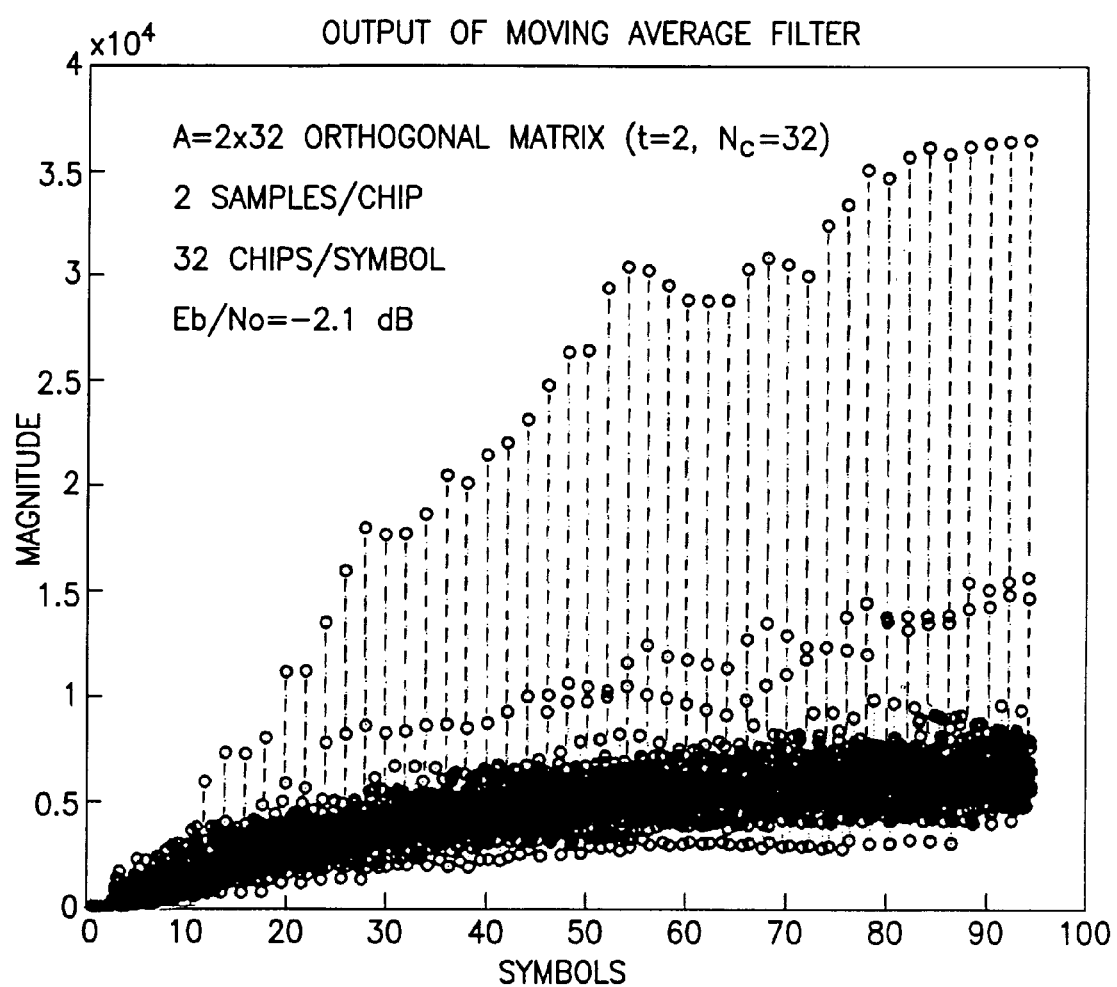
FIG. 7 is a graph showing the output of the moving average filter at $E_b/N_0=-2.1$ dB for a spread spectrum system.

The response of the moving filter 26b implemented as above, at $E_b/N_0 = -2.1$ dB, is shown for a spread spectrum system at FIG. 7.

PHASE LOOP 27 OPERATION. Like the description of the timing loop 26, the following discussion presumes a MIMO system for which the present invention is most useful. The magnitude and phase of a wireless MIMO channel are found by applying standard results of linear extraction theory.

For example, in a system with two transmit antennas and two receive antennas, estimated parameters are used to compute estimated pair-wise error probability and capacity for a given channel classification. An eigenvalue analysis suggested by the commonly referred "water filling" solution to Shannon's Capacity theorem for MIMO systems is a preferred approach. Sharnnon's Capacity Theorem for N independent channels is:

$$C = \sum_{t=1}^{N} \log\left(1 + g_t^2 \frac{P_t}{\sigma_t^2}\right), \text{ bits/s/Hz} \quad (18)$$

wherein $\sigma^2$ is signal variance and P is signal power. The channel, which for a MIMO system can be written as a matrix of sub-channels, is estimated by finding the best linear unbiased estimate (commonly known as BLUE) when known orthogonal data sequences, such as Walsh-Haddamard codes, are transmitted from each antenna element.

The space-time codewords are defined in terms of a txn matrix, where t is the total number of transmit antennas (number of rows in the matrix) and n is the block length of the codeword (number of columns). Setting $\overline{A}$ as a matrix related to the transmission of the $j^{th}$ column of the space-time codeword $\overline{C}$ yields $\overline{A}=[\overline{\alpha}_1, \overline{\alpha}_2, \ldots \overline{\alpha}_t]$. Each vector component $\overline{\alpha}_i=[\alpha_{i,1}, \alpha_{i,2}, \ldots \alpha_{i,N_c}]^2$, which is a column vector with dimensions $N_c \times 1$ consisting of coefficients that define the transmitter waveform and the receiver 'front end' matched filter. The term $N_c$ is the number of coefficients in the receiver filter matched to the waveform used to transmit the space-time codeword matrix elements. For example, each $\overline{\alpha}_i$ may be a spreading code in the case of direct sequence spread spectrum (DSSS) waveforms, or the coefficient of a pulse-shaping filter in the case of satellite communications. The waveform definition matrix $\overline{A}$ therefore may change with each transmitted column of the space-time codeword. The matrix $\overline{A}$ will be extended for the pulse shaping and CDMA cases as compared to the DSSS case above in order to span several users and/or symbols.

Channel estimation is simplified if the sub-channels of a MIMO system exhibit flat-fading as opposed to frequency-selective fading. Flat fading occurs when the channel delay spread is less than one symbol interval so that the received signal is Rayleigh distributed in magnitude and randomly distributed in phase. Orthogonal frequency division multiplexing (OFDM) is one known modulation technique wherein, by design, sub-channels of a MIMO system are subject to flat fading. Assuming flat fading, let $\overline{C}_j$ be a diagonal matrix with the $j^{th}$ column of the space-time codeword along the diagonal. A $t \times N_c$ matrix $X$ is then:

$$X = \overline{C}_j \overline{A}^* = [c^*_{j,1}\overline{\alpha}_1; c^*_{j,2}\overline{a}_2; \ldots C^*_{j,t}\overline{\alpha}_t]^* \quad (19)$$

and describes the transmitter output sequences as a multichannel signal with each channel (each transmit element or antenna output) represented by the rows of $X$. The sampled multichannel output for the $j^{th}$ transmitted column of the matrix codeword C is then the $r \times N_c$ matrix $\overline{Y}$, wherein:

$$\overline{Y} = \overline{H}\overline{X} + \overline{N} = \sqrt{\rho_r \overline{H}\overline{C}_j\overline{A}^*} + \overline{N} \quad (20)$$

For the linear data model for $\overline{Y}$, the BLUE for estimating $\overline{H}$ is the maximum-likelihood estimator:

$$\hat{H} = \overline{Y}\overline{X}^*(\overline{X}\overline{X}^*)^{-1} \quad (21)$$

wherein X is determined by the space-time code, pulse shaping and signature sequence coefficients, antenna array parameters, and the $E_b/N_0$.

If the transmitted spreading or pulse-shaping codes are orthogonal at the receiver and each is transmitted with equal power, $\overline{A}^*\overline{A}$ is diagonal, and the estimator of equation (21) can be reduced to scaling the output of rt correlation estimators:

$$\hat{H} = \frac{1}{N_c r_{\tilde{x}\tilde{x}}(0)} \overline{Y}\overline{A}\hat{C}_j^* \quad (22)$$

The term $\overline{Y}\overline{A}$ represents the bank of matched filters 24. Multiplication by $\hat{C}_j^*$ represents removing the data modulation with a training/signature sequence or the current symbol estimate. The value $r_{\tilde{x}\tilde{x}}(0)$ is the autocorrelation value at 0 for the rows of X. $E_b/N_0$ estimation is preferably used to determine this value.

The overall response may be factored into separate matrices, so that channel estimation and space-time codeword element matched filter 24 operations may be combined as indicated in FIG. 3. That figure represent the implementation of equation (22). Even if orthogonal codes are used, a matrix inversion algorithm achieves the best possible linear estimation performance. This is because analog components of a physical system necessarily introduce correlation.

Figure 8:
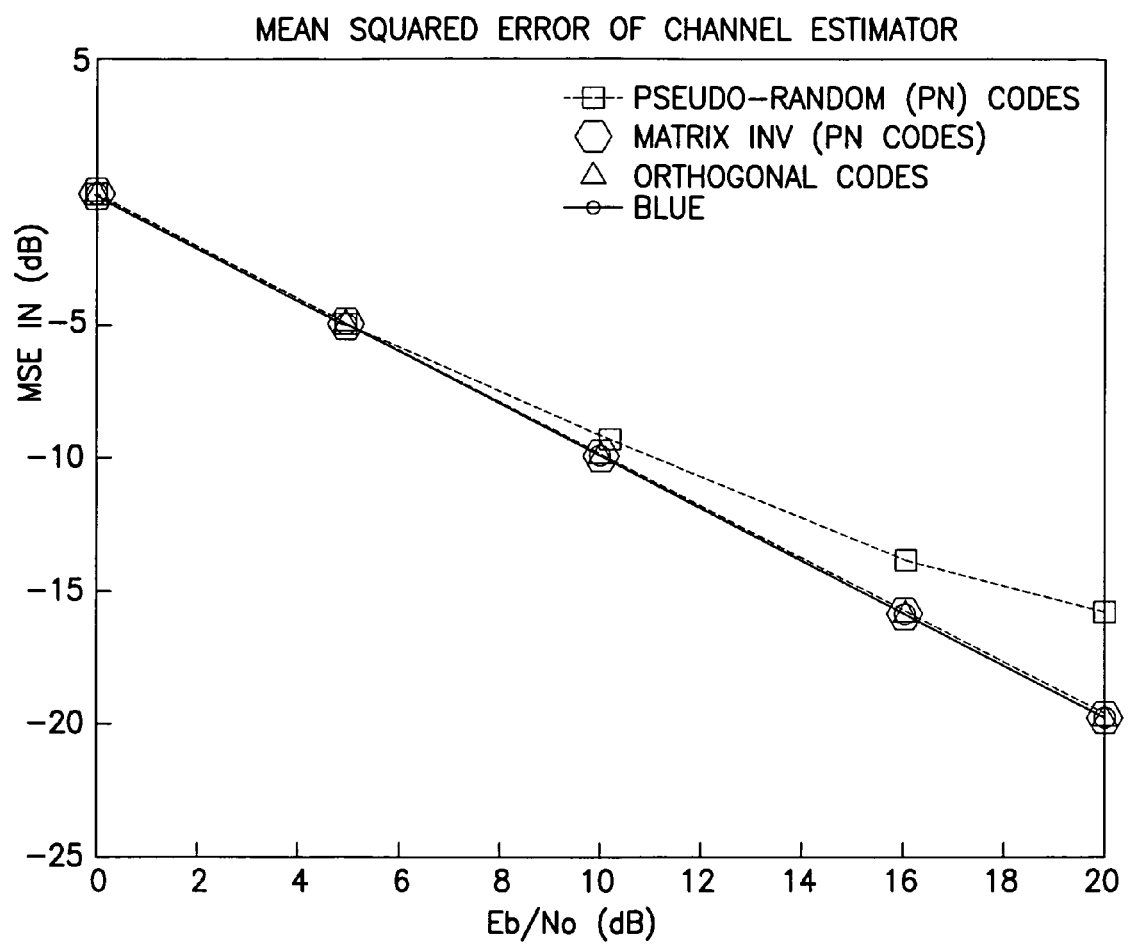
FIG. 8 is a graph of mean square channel error (MSE) for various values of bit energy to noise power spectral density when the $\bar{H}$ matrix changes every space-time codeword.

FIG. 8 is a graph of mean square channel error (MSE) for various values of bit energy to noise power spectral density when the $\overline{H}$ matrix changes every space-time codeword. The direct matrix inversion and independent correlation methods were simulated with signature sequences for each transmit element taken form an orthogonal set and from a psuedorandom set generated with a random number generator. The average correlation coefficient between random code sets of length $N_c$ was $c_{avg}=0.06$. Over the entire code sequence, $C_{avg}=0.0002$. When pseudo-random signature codes are used, the cross-correlation coefficient is small but non-zero, causing the excess estimation error when the matrix $XX^*$ to be treated as diagonal. This is indicated in the performance plot of FIG. 8 by the flaring at higher $E_b/N_0$ values. The matrix $XX^*$ is preferably inverted to achieve the best possible performance of a linear estimator.

The minimum achievable mean squared estimation error for each element of the estimated channel matrix when $\overline{AA}^*$ is diagonal is given by:

$$MSE_{min} = \frac{N_0}{2r_{\tilde{x}\tilde{x}}(0)} = \frac{N_0}{2N_c/N_c} = \frac{N_0}{2} \quad (23)$$

This represents the MSE of a single symbol. Averaging over multiple symbols makes the MSE:

$$MSE_{min} = \frac{N_0}{2N_{avg}} \quad (24)$$

where $N_{avg}$ is the number of symbols over which the average is performed. Given ideal timing recovery and no channel estimation (i.e., a "non-coherent" matched filter), the output of the matched filter bank is the linear MIMO system model used to derive the capacity equation:

$$\overline{Y}_{MF} = \overline{Y}\overline{A}\overline{1} = \sqrt{\rho_r \overline{H}c_j} + \overline{n} \quad (25)$$

where $\overline{1}$ is the all one's vector and represents equal gain combining of the matched filter bank output.

Waveform distortions could be mitigated by replacing the all one's vector with the original coefficient vector (or matrix) determined by the algorithm of choice. Theoretically, any effect of the channel $\bar{H}$ could be cancelled with a matrix version of an interference cancellation algorithm, and the space-time decoder could be provided with a soft decision matrix codeword corrupted by white Gaussian noise.

While described in the context of presently preferred embodiments, those skilled in the art should appreciate that various modifications of and alterations to the foregoing embodiments can be made, and that all such modifications and alterations remain within the scope of this invention. Examples herein are stipulated as illustrative and not exhaustive.

What is claimed is:

1. A receiver for performing timing recovery at low or less than zero dB signal to noise ratio comprising:
   at least one antenna for receiving a signal vector over at least one complex communication channel;
   an analog-to-digital converter (ADC) for sampling the received signal vector at a fixed rate;
   an interpolation filter having an input coupled to an output of the ADC;
   a matched filter having an input coupled to an output of the interpolation filter;
   a timing correction loop for providing feedback from the matched filter to the interpolation filter, the timing loop operating to determine a minimum mean square error from the output of the matched filter and comprising a filter weight block having an output of one-bit filter weights coupled to an input of the matched filter.

2. The receiver of claim 1 wherein the timing correction loop comprises a magnitude detector having an input coupled to an output of the matched filter for outputting a fractional timing delay that is less than a sampling period $T_s$ of the ADC.

3. The receiver of claim 2 wherein the timing correction loop further comprises a moving average filter and a timing error detector disposed between the magnitude detector and the interpolation filter, wherein the timing error detector is coupled to the output of the moving average filter and computes one of the mean, median, or mode of data output by the moving average filter.

4. The receiver of claim 1 further comprising a phase correction loop for providing feedback from the matched filter to a phase rotator, wherein the phase rotator is disposed between the ADC and the interpolation filter.

5. The receiver of claim 4 wherein the phase correction loop comprises a channel estimator and a phase error detector, wherein the channel estimator determines a maximum likelihood channel for each said channel by multiplying an output of the matched filter by an autocorrelation value and removing data modulation by one of a training sequence and a current symbol estimate.

6. The receiver of claim 1 wherein the ADC samples N times per symbol, wherein N is an integer between two and ten.

7. The receiver of claim 1, wherein the timing correction loop comprises an address generator that outputs a timing offset to the interpolation filter that is determined from a memory address associated with an input timing error.

8. A method of providing timing recovery in a receiver comprising:
   receiving a vector of signals over at least one complex channel;
   sampling the vector of signals at a sampling interval $T_s$;
   re-sampling the vector of signals at a time that maximizes a signal to noise ratio within the sampling interval without adjusting a local clock of the receiver;
   filtering the re-sampled vector of signals with a matched filter controlled by one-bit filter weights;
   wherein the re-sampling is executed by a timing correction loop between the matched filter and an interpolation filter, the timing correction loop comprising a magnitude detector in series with a moving average filter coupled between the matched filter and the interpolation filter.

9. A method of providing timing recovery in a receiver comprising:
   receiving a vector of signals over at least one complex channel;
   sampling the vector of signals at a sampling interval $T_s$;
   re-sampling the vector of signals at a time that maximizes a signal to noise ratio within the sampling interval without adjusting a local clock of the receiver;
   filtering the re-sampled vector of signals with a matched filter controlled by one-bit filter weights;
   wherein the time is determined from the minimum mean square estimate timing error based on maximizing the signal to noise ratio within the sampling interval.

10. A method of providing timing recovery in a receiver comprising:
    receiving a vector of signals over at least one complex channel;
    sampling the vector of signals at a sampling interval $T_s$;
    re-sampling the vector of signals at a time that maximizes a signal to noise ratio within the sampling interval without adjusting a local clock of the receiver;
    filtering the re-sampled vector of signals with a matched filter controlled by one-bit filter weights;
    wherein the time that maximizes the signal to noise ratio within the sampling interval without adjusting the local clock of the receiver is determined from a lookup table that associates a memory address with a timing error.

11. The method of claim 10, wherein the timing error is determined from an output of the matched filter as a minimum mean square estimate.

* * * * *